(12) United States Patent
Castellano

(10) Patent No.: US 6,674,750 B1
(45) Date of Patent: Jan. 6, 2004

(54) APPARATUS AND METHOD FOR COMMUNICATING TIME-DIVISION MULTIPLEXED DATA AND PACKET DATA ON A SHARED BUS

(75) Inventor: Robert Castellano, Howell, NJ (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/404,884

(22) Filed: Sep. 24, 1999

(51) Int. Cl.[7] .................. H04L 12/66; H04L 12/40; H04L 12/413; H04J 3/02
(52) U.S. Cl. .............. 370/354; 370/352; 370/353; 370/447; 370/462
(58) Field of Search ..................... 370/447, 462, 370/438, 439, 352–354

(56) References Cited

U.S. PATENT DOCUMENTS

| | | | | |
|---|---|---|---|---|
| 5,377,189 A | * | 12/1994 | Clark | 370/462 |
| 5,719,858 A | | 2/1998 | Moore | 370/347 |
| 6,154,465 A | * | 11/2000 | Pickett | 370/466 |

* cited by examiner

Primary Examiner—Dang Ton
Assistant Examiner—Ron Abelson
(74) Attorney, Agent, or Firm—Thomas, Kayden, Horstemeyer & Risley

(57) ABSTRACT

A method and apparatus for communicating both packet data and time division multiplexed (TDM) transmissions over a shared bus. An apparatus is providing having a shared data communication bus and first and second control signals. The first control signal indicates the transmission of time division multiplexed data on the shared data communication bus, while the second control signal indicates the transmission of packet data on the shared data communication bus. A plurality of packet modules are provided, wherein each packet module is responsive to the state of the first and second control signals, and each packet module is further configured to transmit and receive data across the shared data communication bus. A plurality of synchronous interfacemodules are further provided, wherein each synchronous interface module is configured to transmit and receive data across the shared data communication bus. The method includes the steps of asserting a packet data transmission inhibit signal whenever TDM data transmissions are occurring over the shared bus and de-asserting the packet data transmission inhibit signal whenever no TDM data transmissions are occurring over the shared bus. The preferred method further includes the step of allocating a portion of a data transmission bandwidth of the shared bus, to the transmission of packet data. Finally, the preferred method includes the steps of inhibiting the communication of packet data over the shared bus when the packet data transmission inhibit signal is asserted, and permitting the communication of packet data over the shared bus (in the allocated portion of the data transmission bandwidth) when the packet data transmission inhibit signal is de-asserted.

5 Claims, 14 Drawing Sheets

FIG. 6A

| FRAME | TIME SLOT 1 | TIME SLOT 2 | TIME SLOT 3 | TIME SLOT 4 | TIME SLOT 5 | TIME SLOT 6 | TIME SLOT 7 | TIME SLOT 8 |
|---|---|---|---|---|---|---|---|---|
| 1 | TDM | TDM | TDM | PACKET 1 ADDRESS | START PACKET 1 | PACKET 1 | PACKET 1 | PACKET 1 |
| 2 | TDM | TDM | TDM | PACKET 1 | PACKET 1 | PACKET 1 | PACKET 1 | PACKET 1 |
| 3 | TDM | TDM | TDM | PACKET 1 | PACKET 1 | PACKET 1 | PACKET 1 | PACKET 1 |
| 4 | TDM | TDM | TDM | PACKET 1 | PACKET 1 END | PACKET 2 ADDRESS | START PACKET 2 | PACKET 2 |
| 5 | TDM | TDM | TDM | PACKET 2 | PACKET 2 | PACKET 2 | PACKET 2 | PACKET 2 |
| 6 | TDM | TDM | TDM | PACKET 2 | PACKET 2 | PACKET 2 | PACKET 2 | PACKET 2 |

FIG. 6B

| FRAME | TIME SLOT 1 | TIME SLOT 2 | TIME SLOT 3 | TIME SLOT 4 | TIME SLOT 5 | TIME SLOT 6 | TIME SLOT 7 | TIME SLOT 8 |
|---|---|---|---|---|---|---|---|---|
| 1 | TDM | PACKET 1 ADDRESS | TDM | START PACKET 1 | PACKET 1 | PACKET 1 | TDM | PACKET 1 |
| 2 | TDM | PACKET 1 | TDM | PACKET 1 | PACKET 1 | PACKET 1 END | TDM | PACKET 1 |
| 3 | TDM | PACKET 1 | TDM | --- | PACKET 2 ADDRESS | START PACKET 2 | TDM | --- |
| 4 | TDM | --- | TDM | --- | PACKET 2 END | --- | TDM | PACKET 2 |
| 5 | TDM | PACKET 2 | TDM | PACKET 2 | PACKET 3 | PACKET 3 | TDM | --- |
| 6 | TDM | PACKET 3 ADDRESS | TDM | START PACKET 3 | PACKET 3 | PACKET 3 | TDM | PACKET 3 |

APPARATUS AND METHOD FOR COMMUNICATING TIME-DIVISION MULTIPLEXED DATA AND PACKET DATA ON A SHARED BUS

BACKGROUND OF THE INVENTION

1. Field of the Invention

The present invention generally relates to data communications, and more particularly, to a communications system that communicates both time division multiplexed data (synchronous data) and packet data (variable bit rate) on a shared bus.

2. Discussion of the Related Art

In recent years, there has been a notable migration of digital communications from time-division-multiplexed transmission systems to packet-based transmission systems. This migration has led to the development of communications equipment having the ability to communicate both types of digital transmissions.

In this regard, a communications device known as a "network access unit"(NAU) or "network access switch" (NAS) typically provides network switching services between multiple local and one or more network interfaces. Examples of local interfaces are RS232, DSX-1, EIA-530, etc. Examples of network interfaces are T1, T3, or SONET facilities. A network access unit provides transmission between multiple local communication networks, and a single network facility. The network access switch is a more general device, which provides communication between multiple local and network interfaces. The NAU typically resides at a home office, small office, branch office, or network edge. The NAS typically resides in the network cloud or at a large regional office fed by multiple branches.

To provide the most flexibility, it is preferable that the NAS/NAU support two types of data: synchronous TDM data and packet data. For example, the support of synchronous data provides the ability to make telephone (i.e., voice) calls, while the support of packet data provides access to public or private network packet services. However, the asynchronous nature of packet data at the logical level combined with the requirements of synchronous data causes design tradeoffs in both the complexity and cost of a NAS/NAU.

Network access switching requirements have progressed from providing TDM only type switching services, to packet only type switching services, to hybrid TDM/packet type switching services. The architecture of the NAS/NAU has evolved in order to support the more recent requirements for packet, and hybrid TDM/packet type services.

Early NAU/NAS architectures were based on a TDM bus architecture (See FIG. 1A). The TDM bus provides for static switching of synchronous traffic between multiple interface modules 110-1, 110-N. The TDM bus architecture is best suited for offering TDM services. The TDM bus design offers lowest complexity, a minimum and constant transmission delay, guaranteed network bandwidth, and provides a robust ability to switch reconfigurations. The TDM bus allows modules to exchange data based on time slots, which repeat over a fixed frame time. A synchronous data stream is transmitted over the bus by transmitting the required number of bits in each frame time to match the transmission rate of the synchronous data stream. For example, a synchronous data stream of 64 kbps transmits 8 bits across the TDM bus for an 8 KHz bus frame. The number of 64 kbps data streams that can be transmitted across the bus is a function of the bus speed (throughput). Transmission of data across the bus is controlled by a time slot map, which is typically resides in each of the modules. The time slot map defines the times when a pair of modules exchange data across the bus. Essentially two atomic operations are required in the pair of TDM modules to begin exchanging 64 kbps or n×64 kbps data (where n is an integer value). While the configuring of this channel affects the transmission of data for this channel until configuration is complete, traffic transmitted in other channels are not affected by the reconfiguration. The time slot maps are typically structured so that a single 64 kbps or n×64 kbps channel can be added or removed in the network access switch without corrupting or disrupting the transmission of other 64 kbps data streams in the system. The ability to add or remove connections without disrupting existing connections in the NAS is usually a critical service requirement for voice and data networks. Finally, traffic delay across the bus is largely defined by the bus frame rate. Minimizing the switching delay is often an important requirement for delay sensitive TDM traffic such as voice. Frame rates of 8 Khz are typical in TDM based systems resulting in traffic delays of 125 $\mu$s to 250 $\mu$s. While the TDM bus is ideally suited for the switching of TDM traffic in the NAS, the classical TDM bus is not suited for the switching of packet traffic.

TDM based network access switches were originally designed for switching voice traffic, and later used to switch data traffic. TDM switches required static connections to be provisioned for the switching of data traffic. The major consideration for data traffic is that it is typically bursty in nature. A high volume of traffic will flow for a short period of time followed by idle periods. The TDM bus does not provide the ability for traffic to be dynamically switched from one module to another module over the bus in time. For a given configuration, the same two TDM modules continue to exchange information during the same time slot, until a reconfiguration occurs. For example, packet traffic from packet module 1 may be switched to packet module 2 in one instant, and then switched to packet module 3 in the next instant. Another consideration for supporting data traffic is that the actual traffic flow and connections are typically highly bursty as well. One machine may be required to exchange data with several machines, requiring multiple static connections in the TDM NAS between the one machine and its peers. Transmission of packet type applications through a TDM NAS typically results in an over provisioning and hence under utilization of NAS bus bandwidth. While information within the packet itself could be used to indicate which of the destination modules on the bus should receive the traffic, the standard TDM bus provides no effective means to use this information.

In order to address the shortcomings and limitations of the TDM switch for packet applications, a new type of NAS emerged to better manage packet data communications. The packet data switch (see FIG. 1B), Frame Relay switch, and multi-protocol router type architectures, provide a more suitable means for switching of packet data traffic. These devices are based on a packet switching bus. The key attribute of the packet switching bus is that the data packet is prefixed with a switching or routing tag which includes an identifier or address which is used by the system to switch (or route) traffic to the intended destination bus module (and interface). Another key attribute is that the bus bandwidth is more dynamically shared between all the modules communicating over the bus. Modules 112-1, 12-n not requiring transmission across the bus during a particular time, allow the packet bus bandwidth to be dynamically allocated to modules requiring transmission. Some of the key elements in a packet switching architecture are dynamic allocation (or arbitration) of the bus bandwidth, formation and identification of packet addressing information, and identification of the beginning and end of a packet. While the packet bus is ideally suited for packet applications, it is not well suited for the switching of delay sensitive TDM traffic. First of all, since information is transmitted across the bus as packets, TDM data first must be accumulated into a packet before it can be transmitted across the bus. Packetization delay of TDM data is a function of the data rate and packet size. The larger the packet and lower the data rate, the larger the delay. A 64 kbps voice stream packetized into a 200 byte packet, incurs a 25 ms packetization delay, which is likely to exceed end-to-end network delay requirements. Further, packet traffic is bursty in nature. Consequently, switching delays across the bus may vary considerably based on traffic load. Not only does the bus latency add to the overall delay, but the delay variation additionally results in a longer play-out buffer on the receive side of the system, where the TDM traffic in the packet is converted back to a TDM format. The longer play-out buffer adds yet another component to the end-to-end network delay. Other possibilities include allowing the TDM traffic to be carried in a smaller data packet, and adding prioritization to the bus arbitration scheme giving preference to the delay sensitive TDM packets over the more delay tolerant data packets.

Other issues with packetization of TDM traffic is the higher cost and complexity of the synchronous interface modules. Forming the payload and header components of the packet, requires higher levels of processing and more buffering than is required for a TDM type bus architecture. The associated packet header required to transmit the TDM traffic across the bus to the required output port/connection adds overhead, resulting in a decrease in usable system bus bandwidth. This is even more so the case if small packets are employed to carry the TDM traffic.

A very prevalent NAS architecture emerging today employing small packets in order to minimize delay of TDM traffic is the "fast packet" or ATM type architecture (See FIG. 1C). ATM technology defines a 53 byte packet (cell) and is designed to provide switching of mixed voice/data traffic types. The ATM switch architecture supports the key attributes facilitating packet data communications, while addressing many of the delay issues associated with packetization and switching of voice. While ATM integrates voice and data traffic types, it does compromise on both throughput and delay. Throughput is reduced for data traffic due to carrying the larger packet in a series of smaller fixed sized packets (segments or cells). Not only is the ratio of payload to header (overhead) bytes reduced, the fixed size cell results in a padding overhead which can be rather significant. Small variable length packets can incur as much as 65% overhead when carried in a fixed size cell. Overhead of voice packets can also be high depending on delay requirements. Voice delay is typically higher than comparable TDM systems. Even though overhead and latency for ATM is higher than its TDM and packet predecessors, they are often down-played. Many ATM products often carry significantly higher system capacities, consequently the overhead becomes less an issue. While bandwidth may not be an issue in ATM switches, it is still an issue for network facilities. Network service providers are still attempting to squeeze every bit of usable bandwidth out of their network facilities to control network costs. Even with the positive view of ATM, the majority of voice traffic is still being carried over traditional TDM facilities, and there are new emerging standards for high speed packet transmission (full packets) which will ultimately compete with ATM. While there are numerous ATM NAS, and NAU type products being introduced into the market today, equipment costs are also a consideration. ATM switching technology is still more costly than its TDM and packet counterparts. While ATM technology advances to new levels of integration, there are still significant power, real estate, and component costs in adapting both TDM and packet data traffic types to the ATM format.

Another prior art approach (FIG. 2A) for integrating TDM/packet traffic is for an NAU utilizing a TDM multiple-access method for packet transmission on shared synchronous serial buses. In this approach multiple TDM and Packet application modules couple to a common TDM bus for communicating data to a Network Access Module. A portion of the TDM bus bandwidth is allocated for packet data and is treated as a multiple access packet channel. Packet modules gain access and share the packet channel using an arbitration method. In this regard, reference is made to FIGS. 2A–2C, which are figures from U.S. Pat. No. 5,719, 858 to Moore (hereinafter "Moore"). Moore discloses a method for access arbitration to the packet bandwidth employing a counter which is controlled via a PREQ signal 312 is defined.

Moore also defines a method for determining when the bus is in use, and when a packet transfer is complete releasing the bus employing a PHOLD signal 311. This approach provides an efficient substrate for aggregating packet traffic over a TDM bus in a NAU. One of the advantages with this approach is that a centralized packet manager is not required. Packet processing and buffering is distributed in each of the Packet Application modules; these functions are not required in the Network Access Module. Packet sources share the allocated TDM bus bandwidth reserved for the packet channel, which maximizes bus efficiency. This approach offers modularity as well as other advantages.

While the architecture and method of Moore are well suited to a Network Access Unit (NAU), they are limited in fulfilling the requirements of the more general Network Access Switch (NAS). One of the fundamental differences between the NAU and NAS is in how the system is designed to allow modules to exchange data with each other in the system. In a NAU, the system is designed such that application modules only exchange data with the network access modules (and vice versa). This precludes configurations such as those where traffic entering each of three specific modules is to be switched to each of the others and other similar configurations, typical of an NAS. Another limitation is that in order for the NAU to not require buffering, the rate of the packet channel over the bus must be identical to the rate of the packet channel defined over the network access facility. While there are no issues with this being the bus speed of the packet channel when there is a single network facility, it is insufficient when used to support transmission of packet traffic over multiple network interfaces. An alternative approach would be to allow for multiple packet channels over the bus. Each packet channel would be specifically associated with a particular network access facility. While this approach may work, it would require the structures supporting the Packet/TDM interface to be duplicated for each supported packet channel. This is neither practical, cost-effective, nor scalable for a network access switch.

Another limitation of Moore is the shared serial bus architecture, which inherently limits the capacity of the system. As reported, shared serial buses with rates of 10–33 Mbps are feasible. This is fine for NAUs having 1 or few T1's. This is insufficient for a T3 NAU, and grossly inadequate for a broadband NAS. Increases in the bus capacity also increase the complexity of the packet application modules, requiring larger time slot maps to couple to the TDM bus.

The most significant limitation of the Moore architecture is the requirement for each of the packet application modules to maintain a copy of the time slot map for coupling to the TDM bus. The time slot map in the packet application module defines which of the bus time slots are allocated to the shared packet channel. The time slot map defined to access the packet channel ends up being identical for all packet modules, since the packet channel is shared by all the packet modules. Requiring multiple copies of the time slot map in each of the modules affects the cost and the flexibility of the system. The cost of the time slot map in the packet module is a function of its size and dependent on the total number of time slots (ie. bandwidth) in the system. The higher the system bandwidth, the higher the cost for this function in each of the packet modules. Not only does it seem somewhat redundant to maintain the same time slot information in all of the modules, the usage of this map by the packet modules is solely to determine whether or not a time slot is allocated for packet transmission. The value of the time slot map for this purpose is seriously questioned as compared to the normal role performed by the time slot map in a TDM module. The time slot map of a TDM module is not only used to determine when a TDM module is to transmit data across the bus, it is also used to perform the switching function performed by the TDM module as TDM data is transmitted from its input port onto the bus.

An issue with maintaining identical copies of the time slot map in the packet modules is synchronization. Changes to the time slot maps in different packet modules such as adding or removing packet bandwidth, may disrupt or corrupt current packet data transmission. Each of the packet time slot maps must generally be updated at exactly the same instant in order to not disrupt packets currently being transmitted over the bus. In addition, failure to synchronize the time slot maps may also disrupt the logical functions associated with the packet processing or arbitration state machines. Inconsistent time slot maps may affect the reliability of the arbitration state machines of the different modules resulting in loss of synchronization if these issues are not specifically addressed. This type of coordination was not required for TDM channels over the TDM bus, since reconfiguration of a particular TDM channel does not affect other channels. This is only an issue for the packet type where multiple modules exchange data through a common set of time slots on the TDM bus. Increasing or decreasing the rate of the packet channel does affect the quality of data transmission if no explicit mechanisms are provided to coordinate the changing of the time slot maps. While the requirement for non-disruptive reconfiguration of the packet channel is not significant when there is a single packet channel being transmitted over a single network interface as in the NAU, this is a serious issue when packets are being switched between multiple network interfaces. The seriousness of the problem is even more greatly exacerbated, when packet traffic is disrupted due to requiring more TDM bandwidth. This is the case when 1 or more of the time slots allocated to the packet channel are reallocated to the TDM channel. Reducing the size of the packet channel to provide additional TDM channel disrupts (or corrupts) transmission of all the packet channels. The system and method of Moore do not address this system requirement.

While it is desirable to implement a common bus structure for the integration packet/TDM traffic within a NAS, the aforementioned methods present a number of system problems. These problems include maintaining low delay, guaranteed throughput for the TDM traffic, dynamic allocation of bandwidth for the packet traffic, low complexity, low bus overhead, and finally bus bandwidth or connection configuration changes which are non-disruptive to packet communications.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method and apparatus for communicating both packet data and time division multiplexed (TDM) transmissions over a shared TDM bus.

In accordance with an aspect of a preferred embodiment, the data communications apparatus further includes a packet network interface module and a synchronous network interface module, both modules in communication with the shared data communication bus. The packet network interface module is configured for communication across a packet-based communication interface, while the synchronous interface module is configured for communication across a TDM-based communication interface. Since the apparatus includes a plurality of packet modules, a bus contention mechanism is provided for resolving simultaneous requests for access to/control of the bus by multiple packet modules. An innovative method of bus contention for the packet channel is described as the preferred embodiment, or may be implemented using a number of ways which are well known.

In accordance with another aspect of the present invention, a method is provided for communicating time division multiplexed data (TDM) and packet data over a shared bus. In accordance with a preferred embodiment, the method includes the steps of asserting a primary packet data transmission inhibit signal whenever TDM data transmissions are occurring over the shared bus and de-asserting the primary packet data transmission inhibit signal whenever no TDM data transmissions are occurring over the shared bus. The primary packet data transmission inhibit signal provides a synchronized indication to all packet modules as to when the system bus can be used for packet data. This synchronization signal eliminates the need for multiple static TDM time slot maps in each of the packet modules. Provision of a common simultaneous reference to all packet modules, enables the system bandwidth available for packet transmission to change without corrupting or disrupting the packet data. The preferred method further includes the step of allocating a portion of the shared bus data transmission bandwidth, to the transmission of TDM data. Finally, the preferred method includes the steps of inhibiting the communication of packet data over the shared bus when the primary packet data transmission inhibit signal is asserted, and permitting the communication of packet data over the shared bus (in the allocated portion of the data transmission bandwidth) when the primary packet data transmission inhibit signal is de-asserted.

In accordance a preferred embodiment, the method, further includes the step of transmitting time-division-multiplexed (TDM) data when the primary inhibit signal is asserted. In the preferred embodiment, TDM data is handled in a manner that is well known—e.g., TDM data transmissions occur in defined time slots. Further still, the method arbitrates the bandwidth of the shared portion of the data transmission bandwidth between two or more packet modules. This step of arbitrating includes the step of resolving contentions between the two or more packet modules for simultaneous access to the shared bus. Arbitration, and signaling to all the packet interface modules as to when the packet bandwidth is being used to transmit a packet across the shared bus is regulated by the secondary inhibit signal. This signal is asserted by the packet transmitter to indicate a packet transmission across the bus. This signal is used by the packet receiver to identify the start and end of the packet. It is also used as an indication to the other packet modules that a packet transmission is in progress. The remaining packet modules use this signal to determine when the transmission has completed, and can begin contending for a new packet transmission.

In accordance with another aspect of the invention, a method communicates time division multiplexed data (TDM) and packet data over a shared bus by dedicating a portion of a data transmission bandwidth of the shared bus to TDM data transmission and allowing the remaining system bus bandwidth of the shared bus for packet data transmission. The method further operates by asserting a primary packet data transmission inhibit signal for each TDM data transmission occurring over the shared bus. This prevents or suspends the transmission of packet data for each bus time slot used for TDM data transmission. Packet data transmission proceeds during time slots not allocated for TDM transmission, as indicated when the primary packet data transmission inhibit signal is de-asserted. More specifically, this packet communication step further includes the steps of receiving a request to transmit packet data from a packet module, resolving any request contentions (if more than one packet module requests permission to transmit a data packet), granting access for one of the packet modules to the shared bus, monitoring the state of current packet transmission over the bus to determine when packet transmission has completed. Finally, evaluating the state of the secondary packet data transmission inhibit signal, for the purpose of regulating the transmission of the data packet over the shared bus.

DESCRIPTION OF THE DRAWINGS

The accompanying drawings incorporated in and forming a part of the specification, illustrate several aspects of the present invention, and together with the description serve to explain the principles of the invention. In the drawings:

FIG. 6A is a table illustrating data transmissions in accordance with one embodiment of the present invention;

FIG. 6B is a table illustrating data transmissions in accordance with another embodiment of the present invention;

DETAILED DESCRIPTION OF THE PREFERRED EMBODIMENT

Figure 1A:
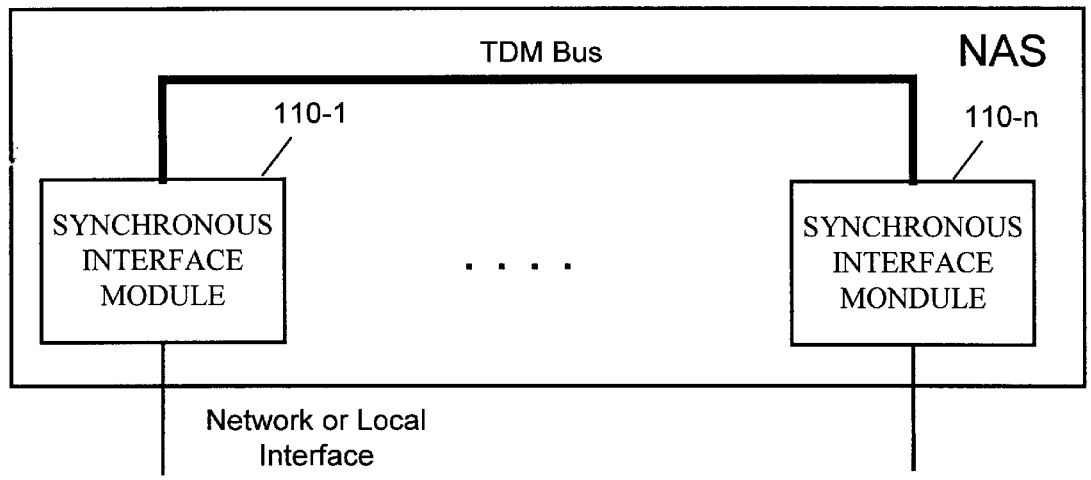
FIGS. 1A–1C are block diagrams illustrating a system known in the prior art.
Figure 1B:
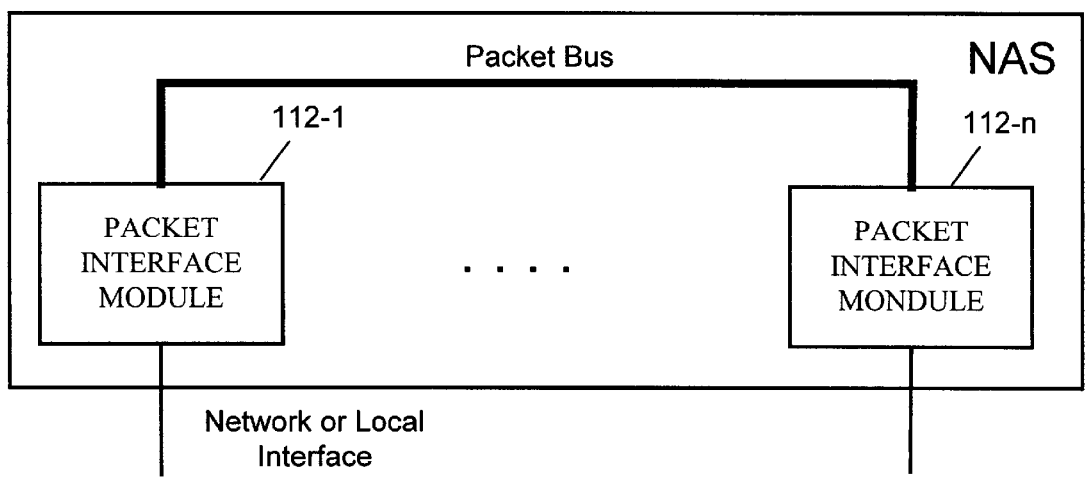
Figure 1C:
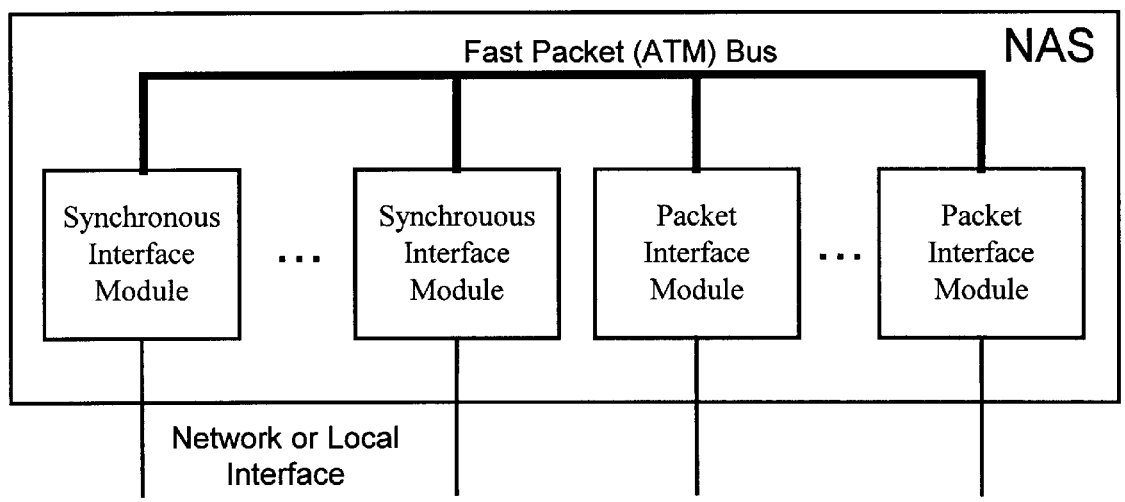
Figure 2A:
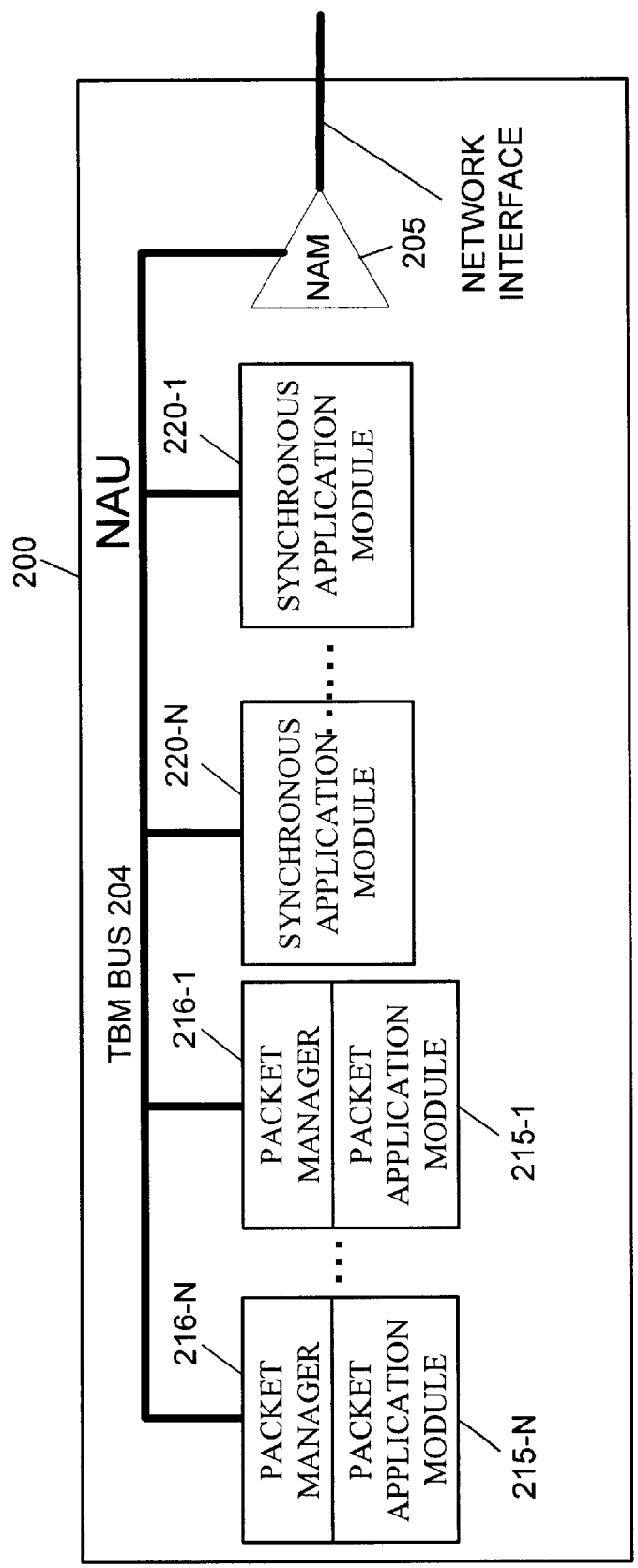
FIGS. 2A–2C is a block diagram illustrating a system known in the prior art.
Figure 2B:
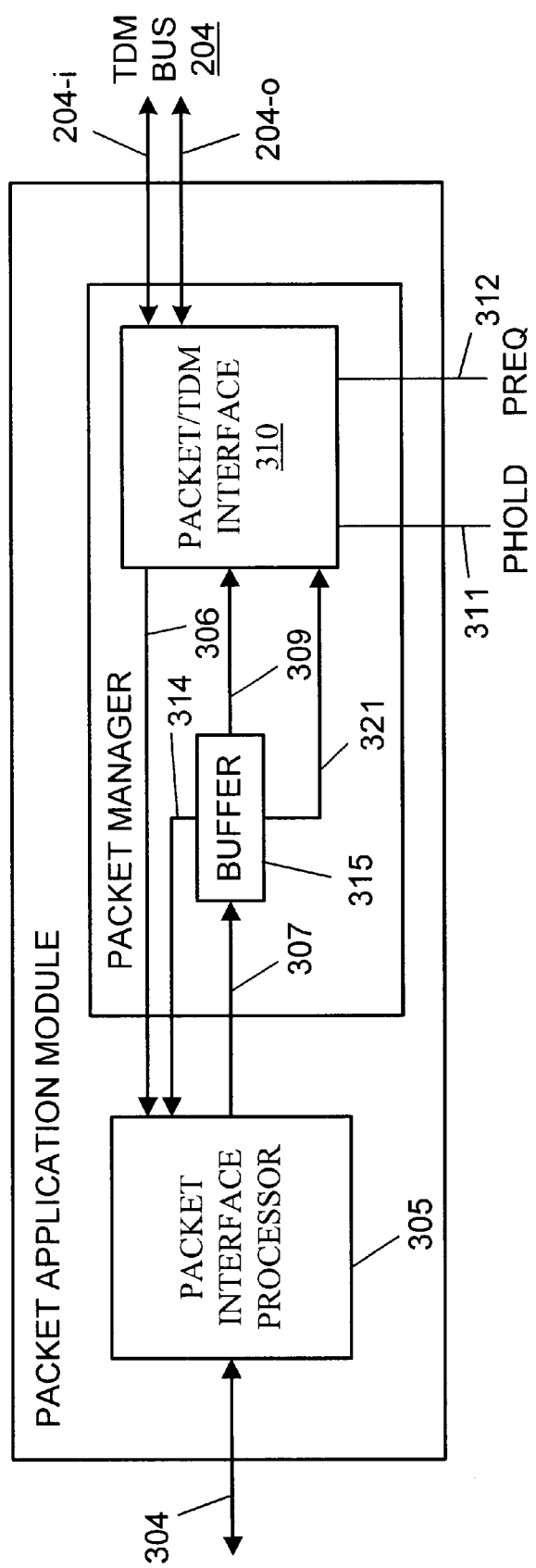
Figure 2C:
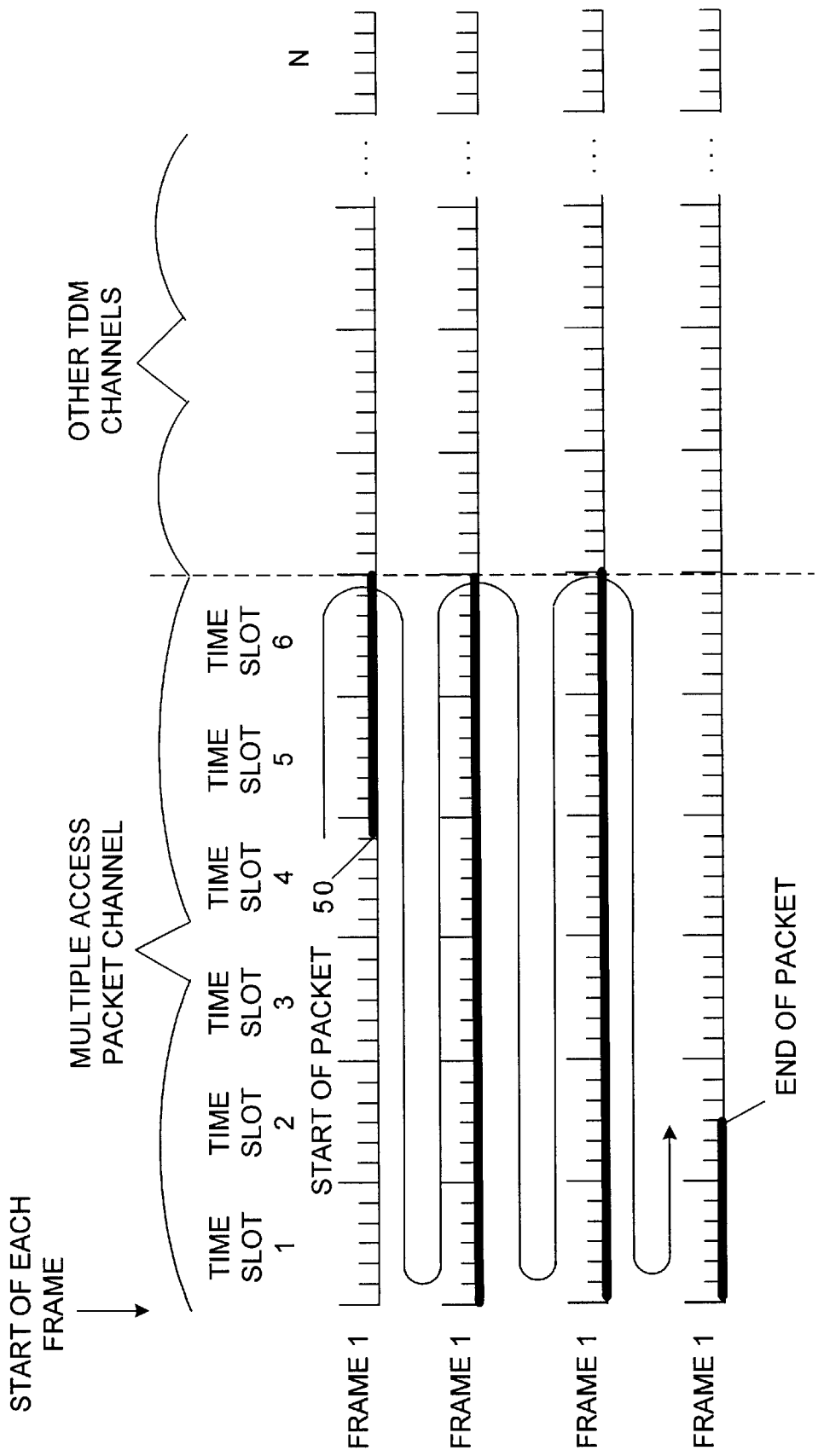

Having summarized the inventive concepts of the present invention, reference is now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

As mentioned above, the present invention is generally directed to a method and apparatus for communicating both packet data and time division multiplexed (TDM) transmissions over a shared TDM bus. The shared bus consists of either one or more signals through which packet or synchronous interfaces modules coupled to the bus can transmit and receive data. Typical implementations may define a bus size of "n=1,2,4,8,16,24, or 32" data bits. During each cycle of the bus, "n bits" of data may be transmitted from the transmitting module to the receiving module. Both the transmitters and receivers are coupled to the same bus so that data can be read by the receiver while it is being written by the transmitter. A shared TDM bus further defines the transfer of eight bits over the bus which constitutes a time slot. These time slots are defined in relation to a frame pulse. The synchronous interface modules maintain a time slot map, which in conjunction with the frame pulse is used to indicate when a particular TDM module transmits or receives from the bus. The time slot map is typically a memory structure defining what data stored within the synchronous module is transmitted or received across the bus during a particular bus cycle. The memory structure repeats at the same rate as the frame pulse. The time slot map also provides controls that allow the shared bus to be driven during the time slots in which that module transmits over the bus. Bus cycles used to transmit synchronous data across the bus will be driven by one of the synchronous modules. Bus cycles not driven by any of the synchronous modules would ordinarily remain in a tri-state (undriven) condition. In accordance with the principles of the invention, these unused bus cycles can be used by the packet interface modules for the purpose of exchanging packet data. A method is provided whereby these unused timeslots are collectively used to form a packet channel. In order for these bus cycles to be used for the exchange of packet data, a control indication that these bus cycles are available for exchanging packet data is required. As previously noted, while packet interface modules could maintain their own time slot maps indicating the bus cycles available for packet transmission, there are system issues with synchronizing multiple time slot maps in the packet interface modules. In accordance with one aspect of the invention, an apparatus is provided having a shared data communication bus and first and second control signals. The first control signal indicates the transmission of time division multiplexed data on the shared data communication bus, while the second control signal regulates the transmission of packet data on the shared data communication bus. TDM data consists of synchronous 64 kbps or n×64 kbps constant bit rate data. A plurality of packet modules are provided, wherein each packet module is responsive to the state of the first and second control signals, and each packet module is further configured to transmit and receive packet data across the shared data communication bus. A packet in this case may either be a long packet such as Frame Relay, IP, Ethernet, PPP, or a fast packet (cell) such as ATM. A plurality of synchronous interface modules are further provided, wherein each synchronous interface module is configured to transmit and receive TDM data across the shared data communication bus.

Figure 3:
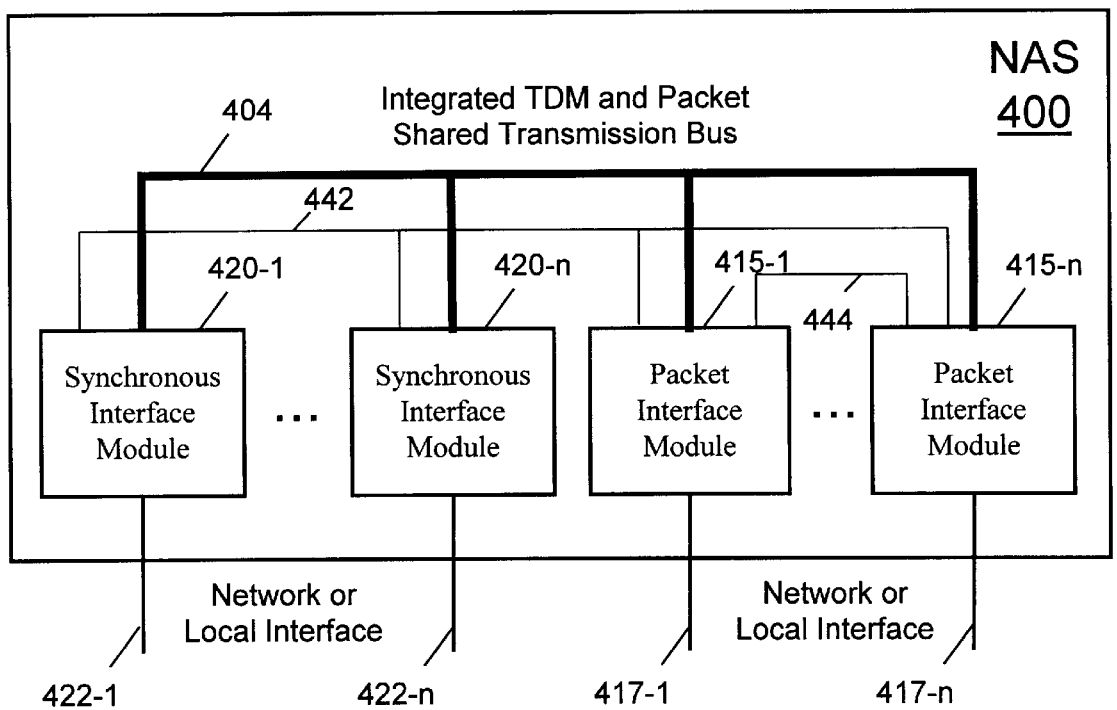
FIG. 3 is a block diagram illustrating a system constructed in accordance with the teachings of the present invention.

An illustrative block diagram of a NAS embodying the principles of this invention is shown in FIG. 3. Device 400 (which may be a NAS) provides network switching services. For example, switching of frame relay or packet services as well as synchronous data transport over 1 or more local/WAN interfaces. For simplicity, synchronous or packet data endpoints or networks, are not shown. Device 400 includes synchronous network interface modules 420-1 to 420-n, and packet interface modules 415-1 to 415-n. The packet interface modules 415-1 to 415-n provide interfaces between the shared bus 404, for transmission of packet data to packet interface modules 415-1 to 415-n. Synchronous interface modules 420-1 to 420-n provide interfaces between the shared bus 404, for transmission of TDM data to TDM interface modules 420-1 to 420-n.

The synchronous interface modules 420-1 to 420-n couple synchronous data equipment or network facilities, such as local telephone equipment, T1, or T3 network 422, to the shared bus 404, as is known in the art. In accordance with the preferred embodiment, multiple packet interface modules share the available portion of the system bandwidth not required by the TDM modules (described below). Each of the plurality of packet interface modules 415-1 to 415-n couple packet data equipment or network facilities 417, e.g., a data terminal or packet data network, to shared bus 404, to the packet interface modules 415-1 to 415-n.

Figure 4A:
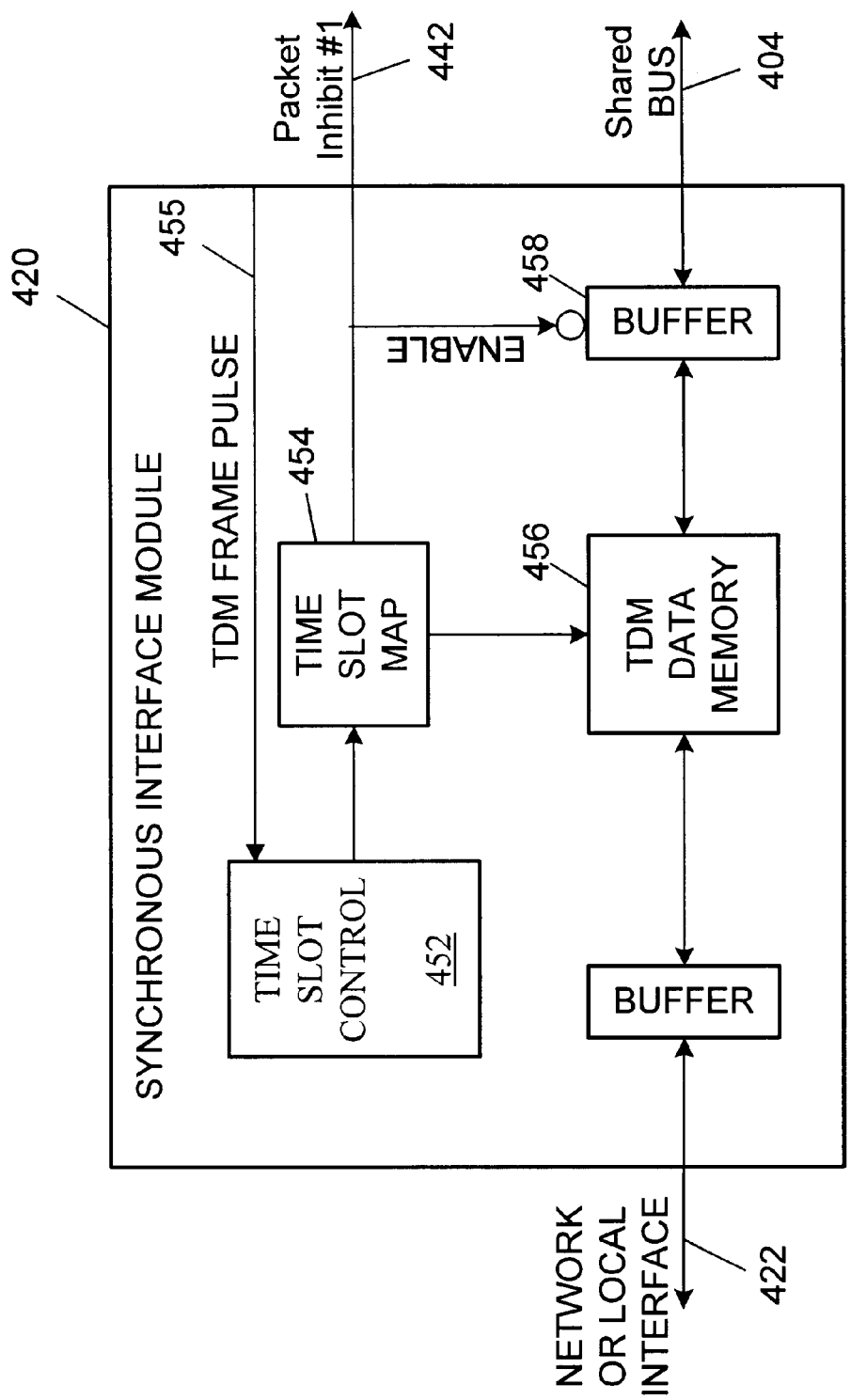
FIGS. 4A and 4B are block diagrams for a portion of the packet and synchronous interface modules respectively. These diagrams illustrate a portion of the packet and TDM interfaces to the shared bus, constructed in accordance with one embodiment of the present invention.

A block diagram of illustrative synchronous interface module 420 is shown in FIG. 4A. The principal components of the synchronous interface module are the time slot control 452, time slot map 454, and TDM data memory 456. Traffic from the network or local interface enters the interface module as either one or more n×64 kbps synchronous data streams 422. Multiple n×64 kbps traffic streams 422 are delimited by a TDM frame. Each n×64 kbps traffic stream 422 is switched onto the shared bus 404 to a destination synchronous interface module 420-1 to 420-n. Traffic is switched across the shared bus 404 using designated time slot assignments. The synchronous interface module components facilitate the processing of synchronous traffic. Traffic for each TDM frame is temporarily stored in TDM data memory 456 in order to synchronize the arrival of data from the interface until it is transmitted onto the associated time slot of the shared bus. TDM data memory 456 is organized such that each location in memory holds one time slot worth of synchronous data.

The time slot map 454 is used to determine the location in TDM data memory 456 synchronous data should be written to (read from). The time slot control function is synchronized with the system TDM frame pulse 455, and is used to determine which location in the time slot map 454 should be accessed. The time slot map 454 is sized to provide one location for every time slot supported by the shared bus 404. The index into the time slot map 454 is relative to the system TDM frame pulse. The time slot map 454 defines whether or not TDM data is to be transmitted onto the bus, and if so, which location in TDM data memory 456 is transmitted onto the bus. In a typical TDM system, the time slot map 454 typically provides a signal indicating that it is to transmit a time slot of data onto the shared bus 404. This signal is typically used to enable a buffer 458 allowing TDM data to be transmitted by the module onto the shared bus. Buffer 458 is a common bus transceiver function, for transmitting signals from one side of the transceiver to the other as is known in the art. This buffer enable signal 442 is also driven onto the backplane bus indicating that TDM data is currently being transmitted for this time slot. This signal is wired-ANDed across all modules. If any of the synchronous modules 420-1–420-n are transmitting TDM data across the bus for a particular time slot, this signal 442 is driven low. If none of the synchronous modules are transmitting TDM data across the bus for a particular time slot, this signal 442 is high. This signal is the Packet Inhibit #1 signal 442 defined in this invention, which is used to suspend transmission of packet data between Packet Interface Modules 415-1–415-n. The major significance of using this signal derived from the Synchronous Interface Module 420 time slot map 454 is that when a change to the time slot map 454 occurs, this signal 442 immediately indicates to packet modules whether or not the bus can be used for the exchange of packet data. For example, if a time slot on the shared bus 404 is allocated for the transmission of TDM data, as soon as this module begins driving synchronous data onto the shared bus 404, all the packet modules immediately know that the time slot no longer contains packet data. This eliminates the need to maintain time slot maps 454 in each of the packet modules, and further allows TDM configuration changes without corrupting or disrupting the packet traffic.

Figure 4B:
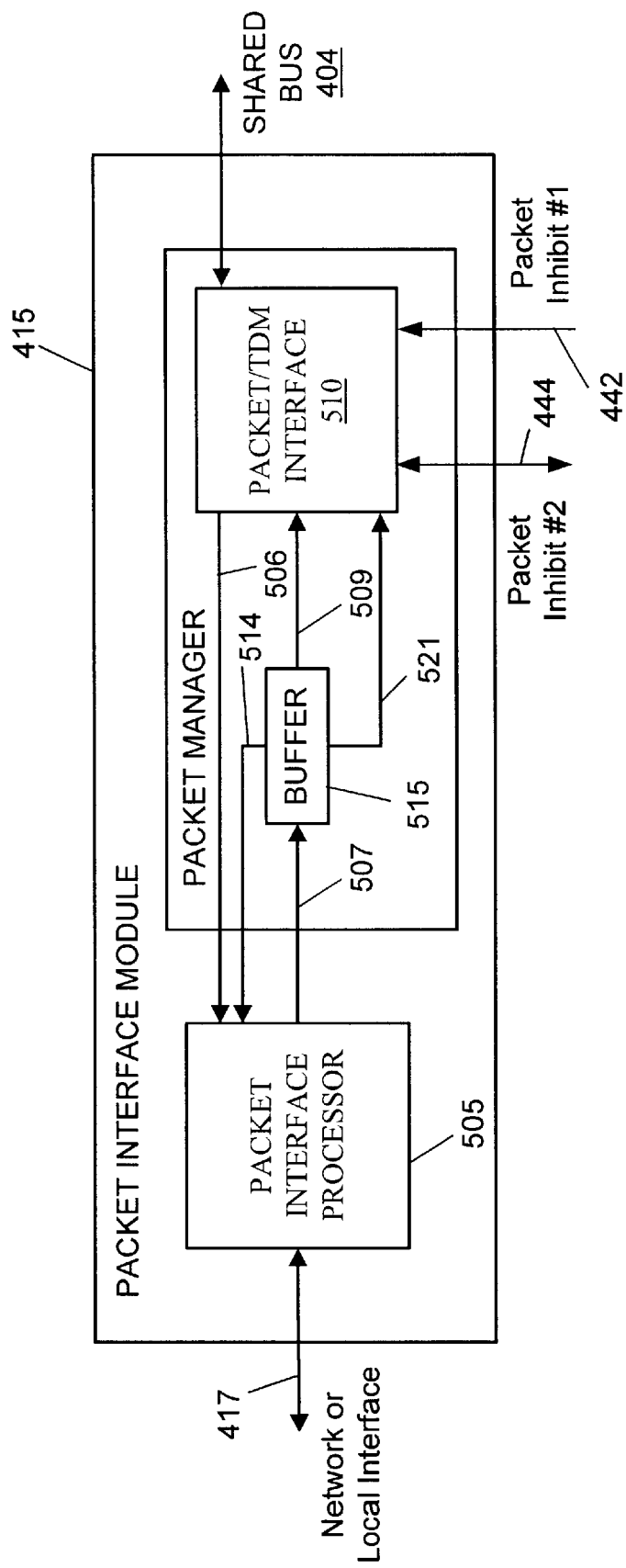

A block diagram of illustrative packet interface module 415 is shown in FIG. 4B. The principal components of packet interface module 415 are well-known and will not be described in detail. Packet interface module 415 includes packet interface processor 505, buffer 515, and packet/TDM interface 510. The functional operation of 510 are specified by the descriptions associated with FIGS. 8B and 8C. The latter is preferably an "application specific integrated circuit" (ASIC), which is a programmable large-scale integrated circuit device that is dedicated to performing a specific function, or application, which in this case is described below. Packet interface processor 505 communicates packet data between packet/TDM interface 510 and line 417. The line 417 is representative of any one of a number of facilities for coupling packet interface module 415 to a packet system. For example, line 417 could be a local area network, or a dedicated facility to a "router" or a packet data network. Packet interface processor 505 performs packet handling, e.g., it provides the physical and link layer connections packet transmission as known in the art, e.g., it checks for addresses, errors, etc., on the packets.

Packet data transmitted to a far-end packet endpoint is provided from packet interface processor 505 to packet/TDM interface 510 via line 507, buffer 515, and line 509. It is assumed that lines 507 and 509 are representative of wideband data buses known in the art. In the other direction, packet data from a far-end packet endpoint received by packet interface processor 505 from packet/TDM interface 510 via line 506. Packet interface processor 505 receives a BUFFER FULL signal via line 514 from buffer 515, which provides a BUFFER NOT EMPTY signal via line 521 to packet/TDM interface 510. In accordance with the preferred embodiment of the invention, packet/TDM interface 510 synchronizes packet data retrieved from buffer 515 for insertion into an appropriate time slot on shared bus 404. In order for the shared bus to perform switching of traffic between multiple interface modules, it should be a common bidirectional bus as in the preferred embodiment. A dual half duplex bus could be implemented in an alternative bus design coupling the interface modules to a central switching module.

The storage buffer 515 is intended to regulate the traffic between the network interface and the packet data bus. The buffer is designed to handle bursts from the network interface or shared bus, when the burst rate exceeds the outgoing transmit rate. Traffic received from the network interface 417 is stored in the buffer 515 prior to transmission onto shared bus 404. Traffic received from the shared bus 404 is stored in the buffer 515 prior to transmission onto the network interface 417. Traffic bursts received from all the network interfaces 417-1 to 417-n may briefly exceed the packet channel capacity of bus, requiring buffering. Even if the network interfaces do not exceed the packet channel capacity of the bus, buffering is still required due to bus access latency. In the egress direction, the storage buffer 515 is even more critical if the peak packet channel capacity greatly exceeds the rate of the network interface. In addition, backplane packet bandwidth can be limited by the number of time slots allocated to packet modules.

In accordance with one embodiment of the invention, a portion of the bandwidth of shared bus 404 unused for TDM is available for packet data. In particular, this portion of the bandwidth is referred to herein as a "multiple-access packet channel," which is shared among at least two packet interface modules. This is in contrast to allocating a fixed fraction of the TDM bandwidth to each packet interface module. The "multiple access packet channel" provides a single channel for communicating all packet data to, or from, packet interface modules 415-1 to 415-n. In effect, this "multiple-access packet channel" resembles a packet "local area network" (LAN) in many respects, except that the bandwidth of the "multiple access packet channel" is defined by the unused TDM bandwidth of the shared bus 404. (In this case, each packet interface module contends for the bandwidth of the "multiple-access packet channel" with the other packet interface modules.) The nature of a standard TDM bus prevents modules from sharing multiple time slots on the TDM bus, but this approach makes the bus bandwidth available for packet data dynamically available to each packet interface module as a channel for the transport of packet data.

Synchronous interface modules 420-1 to 420-N exchange TDM data over the bus via time slots, as is known in the art. In addition, there is a control function in the NAS which allocates the time slots to the synchronous interface modules. The control function configures each synchronous interface module with the time slots for which it will transmit and receive TDM data over the bus. This function may either reside on one of the synchronous interface modules or in a common control module. Transmission of control and status information from the control function to the synchronous interface modules may either be over the shared bus, or use some other means, as is known in the art. In accordance with the principles of the invention, these synchronous interface modules may drive the primary packet inhibit signal 442 to its active state, during time slots in which the associated synchronous interface module transmits data onto the shared bus 404. Furthermore, this primary packet inhibit signal 442 is readily derived on each synchronous interface module 420. The synchronous modules must generate a signal in accordance with their time slot maps for the purpose of driving its transmit TDM data onto the shared bus 404. This local signal which ordinarily is used to enable the synchronous module's bus transceiver for transmission onto the shared bus, is also driven as a control signal over the system bus as the primary packet inhibit signal 442. This results in the primary packet inhibit signal being driven to the active state for all the allocated TDM transmissions over the bus. It also further results in the signaling of the non-TDM (unused) time slots during its inactive state, thus constituting the "multiple-access packet channel."

As will be further described below, each packet interface module must contend for the "multiple-access packet channel." If a packet interface module "grabs" the "multiple-access packet channel" that packet interface module then transmits using the full packet channel bandwidth. However, if a packet interface module cannot "grab" the "multiple-access packet channel," then that packet interface module must queue, or buffer, the packet. As a result, the flow control is distributed among the packet interface modules.

The properties desired for packet transport on the "multiple-access packet channel" are high bandwidth efficiency, low delay and deterministic fairness. Bandwidth efficiency is a measure of how closely the packet utilization of the "multiple-access packet channel" matches the offered packet load. It also measures efficiency of the channel as the offered packet load exceeds the available bandwidth. Delay is a measure of how quickly a packet can be serviced and transmitted over the bus given a packet load and packet traffic statistics. In general, higher packet channel bus throughput helps reduce delay. Fairness describes how a chosen priority scheme affects the comparative delay of packets through the system under bandwidth contention with multiple packet sources.

Any method used for implementing a "multiple-access packet channel" should be designed to minimize delay and congestion. The method should also provide a priority mechanism among packet sources so that packets are admitted to the bus based on their respective priority, but does not result in blocking of higher priority packets which are queued behind low priority packets. Essentially low priority packets cannot be indefinitely preempted from access to the bus. A weighted round robin servicing combined with multiple priority queues on each of the packet is required to provided transmission of packets over the bus. The ability to support multiple packet priorities over the "multi-access packet channel" is performed by the arbiter. As part of the request for a module to use the "multi-access packet channel," a priority is also indicated. The arbiter uses the priority from each of the requesting modules, as well as other decision criteria to determine which module is granted the "multi-access packet channel" for the next packet transmission.

In the context of the preferred embodiment, it is assumed that all modules are continually listening, to the shared in-bound bus 404 to pull off data addressed to them.

In the case of the packet interface modules 415, it is assumed that each packet interface module is monitoring, or listening to, the "multiple-access packet channel" for packets that have addresses associated with that packet interface module. A packet interface module listens for its header, e.g., virtual address. If the header indicates it is not their packet, the packet is ignored. The remainder of this description will focus on outbound packet traffic.

In accordance with the invention, traditional TDM traffic is integrated with packet, or asynchronous transmission mode (ATM), cell traffic over a shared system bus 404. By introducing at least one control signal to the bus structure, which arbitrates between the two traffic types, a range of TDM and packet applications can be supported in a cost-effective manner. The invention places minimal overhead on both TDM and packet applications, resulting in a system that can deliver high performance TDM, packet, or hybrid applications. TDM bandwidth in this shared bus system is provisioned on a time slot basis, and continues to have properties and advantages as in traditional TDM only busing systems. This includes properties like guaranteed bandwidth, low delay, non-disruptive reconfigurations, simple and flexible sharing of the bandwidth, etc. The remaining system bus bandwidth is available to packet modules on a demand basis. The bandwidth not allocated to TDM has all the properties and advantages of a typical packet busing system. These include bandwidth to transport information between two entities on the shared bus.

The shared TDM and packet bus structure preferably includes a time slotted bus 404 with added control signals 442, 444. The time slotted shared bus 404 is configured such that the transmission of an individual byte is generally independent from the transmission of another byte. Data bytes may originate from different sources on the bus 404 and terminate at different destinations on the bus 404. In TDM transmissions, only the data is transmitted across the bus 404; no header information is needed. In packet transmissions, the only header information that is needed is an address or other identifier of the specific packet module 415-1 to 415-n receiving the current data stream. For each packet transmission (e.g., multi-byte), only one address or other identifier need be transmitted.

Generally, time slots are allocated and deallocated from the shared bus 404 to TDM applications in a conventional manner, as is known in the art. Any time slots not allocated to transporting TDM data across the shared bus 404 are available to all packet applications in the system. Whether or not a bus 404 time slot is being utilized, at any given time, for TDM data is indicated by a first control signal 442, or a packet transmission inhibit signal 442. Although this signal may be implemented in any of a number of ways, in one embodiment it may be driven by open collector (high impedance) logic, whereby it is in an active low state. As illustrated in FIG. 3, this signal line 442 is connected to all the modules, packet modules 415-1 to 415-n, TDM modules 420-1 to 420-n. It will be appreciated that it is driven by (and thus an output signal) the synchronous interface modules 420-1 to 420-n, and is received by (and thus an input signal) to the packet modules 415-1 to 415-n. In a manner that is well known, the primary packet inhibit signal 442, may be pulled high by pull-up resistor (not shown), and driven low by any of the synchronous interface modules 420-1 to 420-n. It will be appreciated that the synchronous modules 420 need not also monitor this line 442 as an input, since each synchronous module is assigned a unique time slot for data transmissions. Therefore, there should never be a time where there is bus contention between synchronous modules 420-1 to 420-n.

The packet modules 415-1 to 415-n, however, use this inhibit signal 442 to determine that the shared bus 404 is available to transport one or more byte(s) of packet traffic. When the signal is asserted (low), the packet modules 415-1 to 415-n are inhibited from transmitting packet traffic over the shared bus 404. When, however, the signal 442 is de-asserted (high), the packet modules 415-1 to 415-n may then resume packet transmission over the bus 404. It will be appreciated that the inhibit signal 442, will be in a de-asserted state at times outside the predefined TDM time-slots.

An issue, however, to resolve relates to how two or more packet modules 415-1 to 415-n, contend for and transmit packet data over the "multi-access packet channel." Such bus contention and packet transmission is preferable resolved, at least in part, through the implementation of the secondary control signal 444. This signal is used to perform the request/grant aspects for arbitration as well providing an indication of the start/end of packet. Although illustrated as extending between the various packet interface modules 415-1 to 415-n, this secondary control signal 444 may be implemented in a number of ways. First, it may consist of independent request/grant/start_of_packet/end_of_ packet signals, which interface to a common arbitration/ contention function 470 (see FIG. 5). It could also comprise a common request/grant/SOP/EOP signal which could either interface to a common arbitration/contention function or a distributed arbitration function residing in each of the packet interface modules 415-1 to 415-n. In any case, if any of these signals are driven by multiple sources, a high impedance/ open collector configuration would be used.

Figure 5:
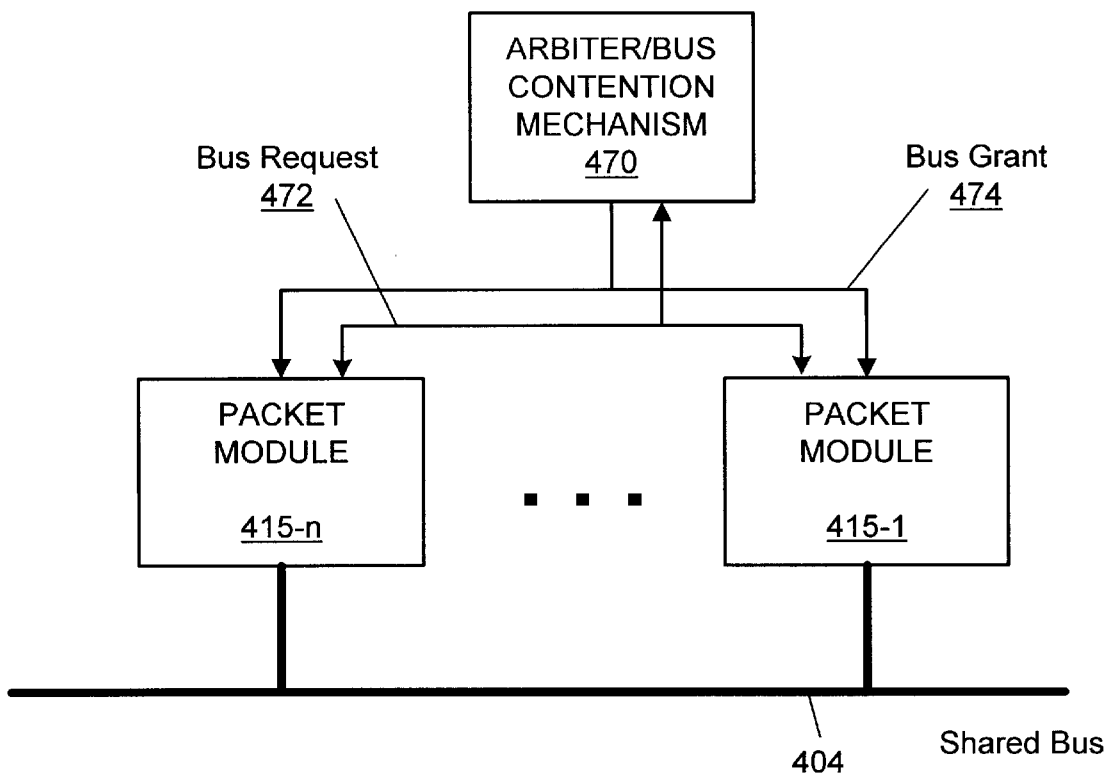
FIG. 5 is a block diagram illustrating a bus contention mechanism constructed in accordance with one embodiment of the present invention.

FIG. 5 illustrates how the secondary control signal is used to regulate the transmission of packets across the "multi-access packet channel." An implementation wherein a bus contention mechanism, such as an arbiter 470, receives a bus request signal 472 from the various packet modules 415-1 to 415-n, requesting access to the shared bus 404. The specific implementation and operation of the arbiter 470 may vary from system to system or embodiment to embodiment, based upon the design goals of the system. For example, it may implement any of a number of conventional contention resolution schemes, such as CSMA-CD, Round Robin Contention, Priority Contention, etc. For purposes of the invention, however, the bus contention mechanism 470, operates by receiving one or more requests for packet transmission over the shared bus 404, resolves any contention, and awards the contention-winning packet module access to the shared bus 404. The arbiter 470 may then assert the bus grant signal 474, informing the various packet modules as to which packet module 415-1 to 415-n is granted transmission over the packet bus. The granted module then asserts the start_of_packet (SOP) signal to indicate the start of packet transmission, and maintains assertion of the signal until transmission of the packet is complete. Since packets can be variable length, the sender must indicate to both the receiver and the other packet modules when the packet transmission is complete. The receiver uses this indication, to determine when to stop receiving from the packet bus. The arbiter uses this indication as to when it may begin a new packet arbitration cycle. It will be appreciated that any given packet module may, by examining the states of the first 442 and second 444 control signals, determine whether the bus 404 is available for packet traffic. The arbiter 470 may indicate the address of the granted module, by encoding the granted module's address on the secondary control lead. Alternatively, the arbiter 470, may place the address of the granted module on the bus 404. In this way, the packet modules 415-1 to 415-n may identify the address to know which one has present control of the shared bus 404.

In the preferred embodiment, the arbiter 470 may be distributed across the packet interface modules 415-1 to 415-n, having the secondary control signal bused between these modules. Individual packet modules may independently drive (e.g. open collector) the second control signal 444. In this regard, the request, grant, SOP, and EOP are indicated via the state of the secondary control signal. The secondary control signal synchronizes the packet module arbitration and transmission functions by being in 1 of 3 states: IDLE, contention, data transmission. During the IDLE state, one or more packet modules may signal they want to contend for the bus. During the contention state, the arbitration logic determines which module is granted access to the bus. During the data transmission state, the granted module holds the secondary control signal in the active state until transmission is complete. The secondary control signal 444 transitions to the IDLE state indicating a new contention cycle can occur.

During the contention state, packet modules apply a contention code to the secondary control signal. Multiple modules may drive the secondary control signal during the contention state, requiring the signal to be an open collector type. The open collector bus is defined such that a '0' state overrides a '1' state on the bus. During the contention state, each module drives one bit of the contention code, and reads the state of the bus to determine if the bus is in the same state as the contention code bit. If it is, it keeps driving the bus. If it is not, the module ceases applying the contention code. Since the contention code includes each respective module's address, the contention codes are guaranteed to be unique. The algorithm is deterministic, in that there is always a single uniquely determined winner. The function uses a collision avoidance algorithm to ensure the arbitration function completes in a fixed number of cycles.

It will be appreciated that, consistent with the concepts and teachings of the present invention, there are a number of ways to implement the bus contention mechanism of the present invention. The manners illustrated and described have been present merely for purposes of illustration.

In keeping with the description of the drawings, FIGS. 6A and 6B are diagrams illustrating the operation of alternative embodiments of the present invention. FIG. 6A illustrates an embodiment for data transmissions in an embodiment where the first three time slots are dedicated solely for TDM transmissions. FIG. 6B illustrates an alternative embodiment for data transmissions, where three dispersed time slots are dedicated for TDM transmissions.

Referring first to FIG. 6A, a table is shown depicting TDM time slots as columns and successive frames as rows. Specifically, in the illustrated embodiment, there are eight time slots, numbered 1 through 8. Certainly, this number may vary greatly in accordance with the preferred system design parameters, but eight channels have been selected for this example, for ease of illustration. The first three time slots, 1–3, are dedicated for TDM transmissions, while the last 5 time slots, 4–8, are available for packet transmissions. The illustrated example assumes a virtually constant demand for packet transmissions.

As illustrated, packet data may be continually transmitted across its available bandwidth. In this regard, data packet 1, which may require a number of time slots, may begin at time slot 4 of frame 1, and transmit across time slots 5, 6, 7, and 8, then continue its transmission at time slot 4 of frame 2. It will be appreciated that, in this embodiment, the system could have three synchronous modules, with a first synchronous module dedicated to time slot 1, a second synchronous module dedicated to time slot 2, and a third synchronous module dedicated to time slot 3. These time slots are unavailable to the packet data modules until they are deallocated.

In the preferred embodiment of FIG. 6B, time slots 1, 3 and 7 are reserved for TDM transmissions. Time slots 2, 4, 5, 6, and 8 are unused for TDM and available for packet transmissions. In this example, there is a less than constant demand for packet transmissions. In this regard, time slots designated with " - - - " indicate that no packet data is being transmitted during that time slot. In the same manner as described in connection with FIG. 6A, a single packet may extend across a number of time slots and frames. Furthermore, FIG. 6B illustrates the transmissions of data packets labeled Packet 1, Packet 2, and Packet 3. In this regard, Packets 1 and 2 may be consecutive packets from the same packet module or alternatively they may be two different packets from two distinct packet modules. Whether they originate from the same packet module or not will be determined by the bus contention mechanism, as described above.

It's important to note here that TDM channels can be added or removed without disrupting packet transmission. Packet transmission is able to dynamically adapt to changes made to the TDM allocation of the bus bandwidth. For example, TS2 in FIG. 6A is initially allocated to TDM. TS2 can be deallocated sometime during frame 3 which is concurrent with the transmission of Packet 1. As soon as the time slot map in the synchronous module driving TS2 is deactivated, the packet inhibit 1 signal returns to an inactive state during TS2, resulting in data from Packet 1 to be transmitted across the bus during TS2 time slot. The packet inhibit 1 signal globally synchronizes the indication to all packet modules that TS2 now carries packet data instead of TDM. TDM data can be allocated to TS7 in a similar manner without disrupting packet data. The only requirement is the TS map change affecting a given time slot, not occur while that time slot is being transmitted across the bus. This is easily accomplished by changing the time slot map during the transmission of an unaffected time slot.

Figure 7:
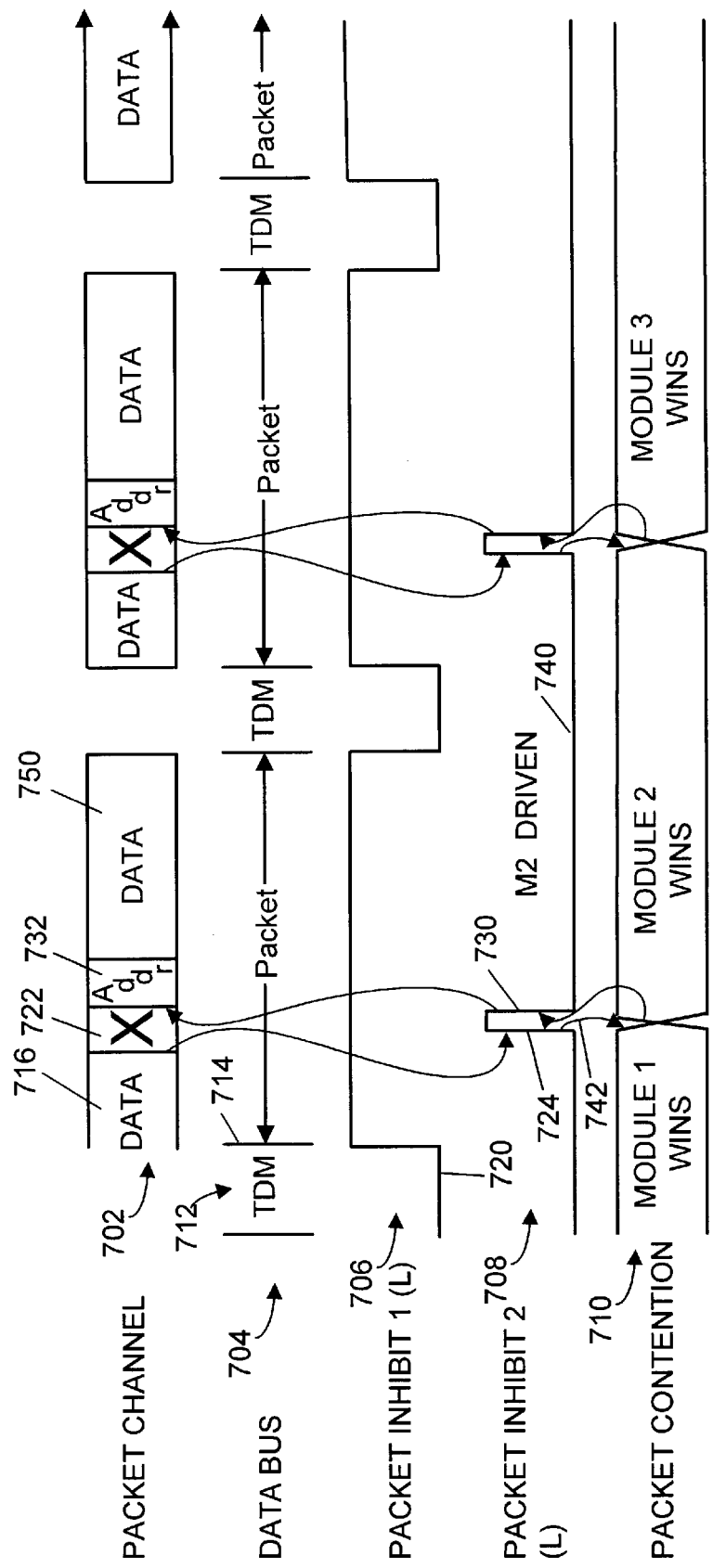
FIG. 7 is a timing diagram depicting the timing of control signals utilized by the preferred embodiment of the present invention.

Referring now to FIG. 7, a timing diagram illustrating the transmission of data and the first and second control signals is shown. More specifically, the diagram illustrates (from top to bottom) signals indicative of data 702/704 transmitted across the packet channel on the shared bus 404 (whether TDM or Packet), the first packet inhibit signal 706, the second packet inhibit signal 708, and the packet contention 710. As will be appreciated, the timing diagram is presented for purposes of illustration, and the signals represented therein may not necessarily be actual electrical signals. For example, the signal labeled as "Packet Contention" is representative of a decision or action that occurs when more than one packet module 415-1 to 415-n is in contention for transmission on the shared bus 404. This decision or action may or may not be embodied in an actual electrical signal, or, indeed, may be embodied in a plurality of electrical signals.

Beginning from the left hand side of the diagram, the system is in a state where TDM data 712 is being transmitted, wherein this TDM transmission has interrupted a packet transmission. Thus, at the end 714 of the TDM transmission time slot, data transmission on the packet channel resumes 716. As illustrated, during the TDM transmission, the first Packet Inhibit Signal 706 is asserted (active low) 720. Thereafter, and by way of example, the packet data 716 presently being transmitted ends 722. This triggers the second Packet Inhibit Signal 708 to become de-asserted 724 (goes high). This signifies the end of the current packet transmission. This is used by the receiver to accept the last byte of the packet. It is also at this time, the system (e.g. arbiter 470) evaluates whether there is any other packet modules 415-1 . . . 415-n having data for transmission/reception. If there is more than one packet module contending for transmission/reception of packet data, then the arbiter 470 will resolve the contention during time 722. In the illustrated embodiment, it is assumed that there is a contention, and that the contention is won by packet module 2. The determination that further packet data is to be transmitted/received causes the second Packet Inhibit Signal 708 to become asserted once again 730. Thereafter, data from that module may be placed on the shared bus 404. This also signifies the start of packet, which shall be used by the receiver to evaluate the address 732 and determine whether it should process the next packet transmitted on the shared bus 404.

In accordance with the preferred embodiment, each packet of data that is transmitted is preceded by the address (or other identifier) 732 of the packet module that shall be receiving from shared bus 404. During the time between the end of the prior data transmission 716 and the subsequent data transmission (commencing with the address), the data on the shared bus 404 is uncertain, indicated by an "X" (don't care). As is further indicated by the timing diagram of FIG. 7, the second Packet Inhibit Signal 708 is driven by the second packet module during the time period 740 in which data to/from the second packet module is being received/transmitted. As illustrated, this same type of signaling repeats itself, as a packet of data ends its transmission and a new packet begins.

It will be appreciated that the timing diagram of FIG. 7 is presented merely for purposes of illustration, and the timing signals will vary depending upon the demand for packet data transmission/reception at any given time. That is, if there is no packet activity during any packet transmission period, then there would be no data present on the packet channel 702. It will be further appreciated that, in order for the packet contention decision to take place, the second Packet Inhibit Signal 708 must be de-asserted. This is indicated by, for example, arrow 742. It should also be appreciated that the second Packet Inhibit Signal 708 can be designed such that it is deactivitated a fixed number of cycles prior to the end of a packet transmission, allowing the arbitration function to overlap with the preceding packet data transmission. This allows the bus arbitration to complete concurrent with the availability of the Packet Channel. Completing the arbitration function earlier, reduces the overhead of the packet channel. Early release of the second Packet Inhibit Signal 708 can only be done as long as the contention function completes in a fixed number of cycles. It will be further appreciated that the diagram of FIG. 7 is not drawn to scale. For example, as illustrated in FIGS. 6A and 6B, a single packet of data may be transmitted over a relatively large number of time slots. However, FIG. 7 has simplified this by illustrating the transmission of a data packet 750 in the relatively few time slots that separate consecutive TDM transmissions.

Figure 8A:
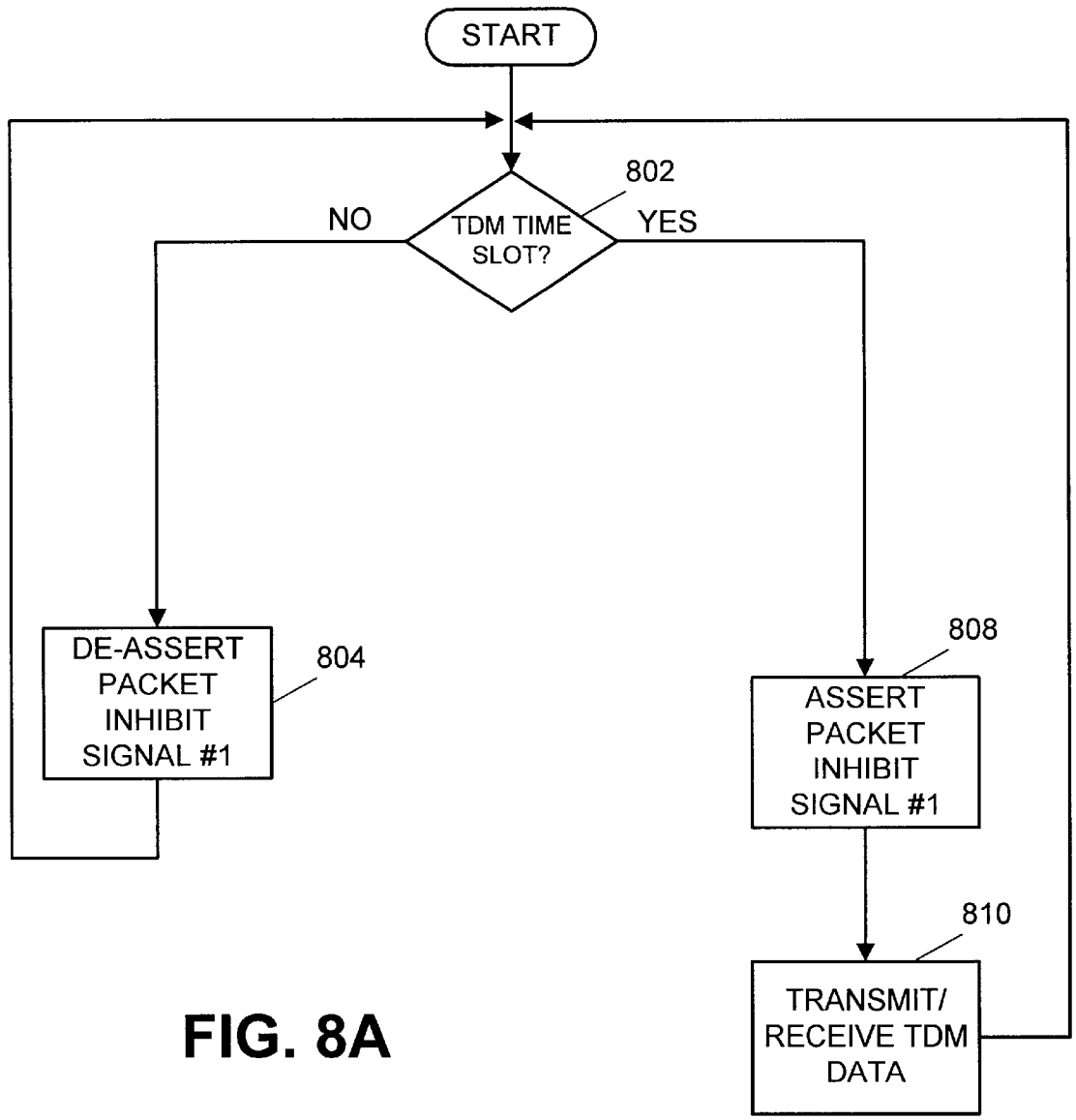
FIGS. 8A 8B, and 8C are flowcharts illustrating the top-level operation of a system constructed in accordance with the teachings of the present invention.
Figure 8B:
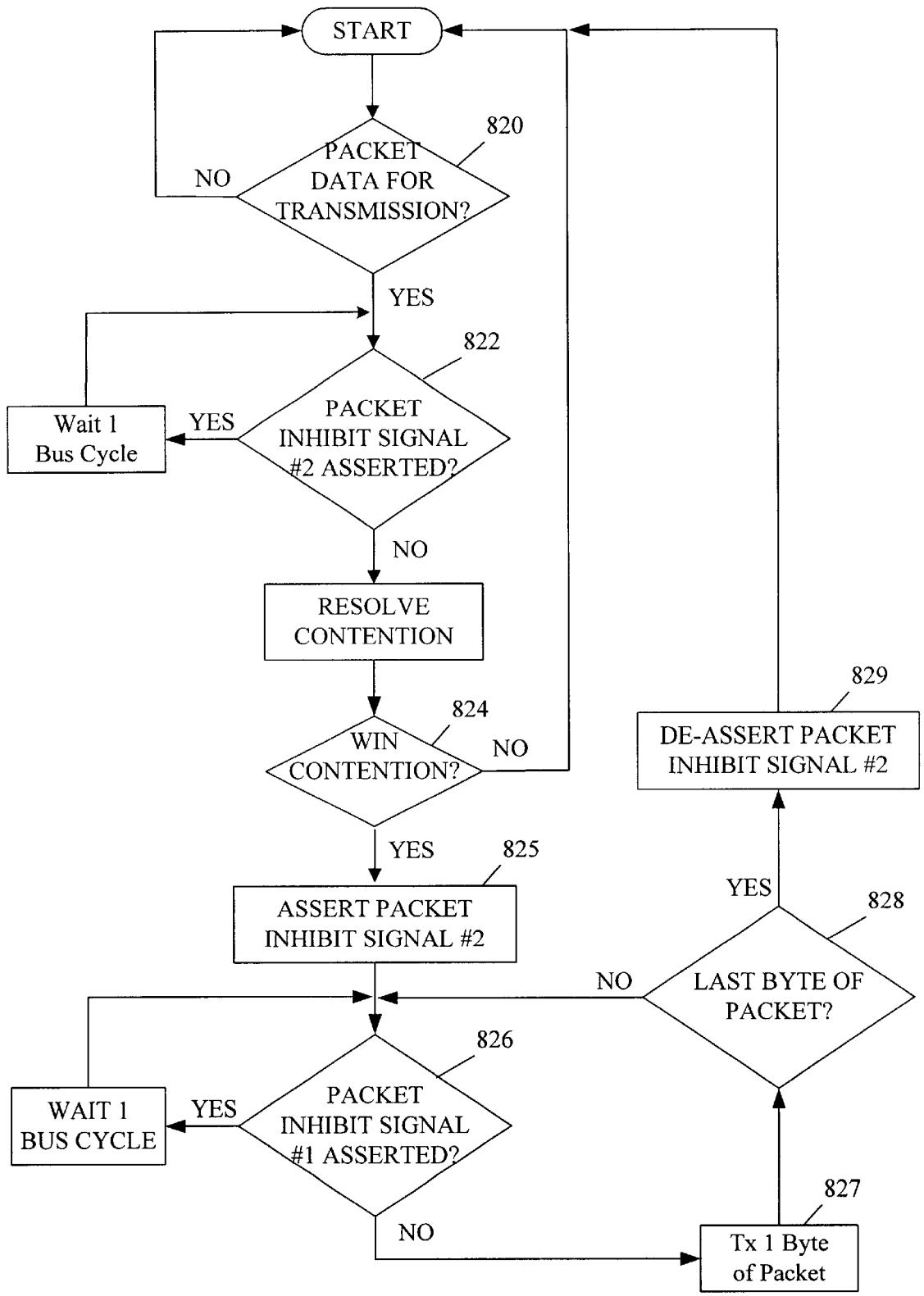
Figure 8C:
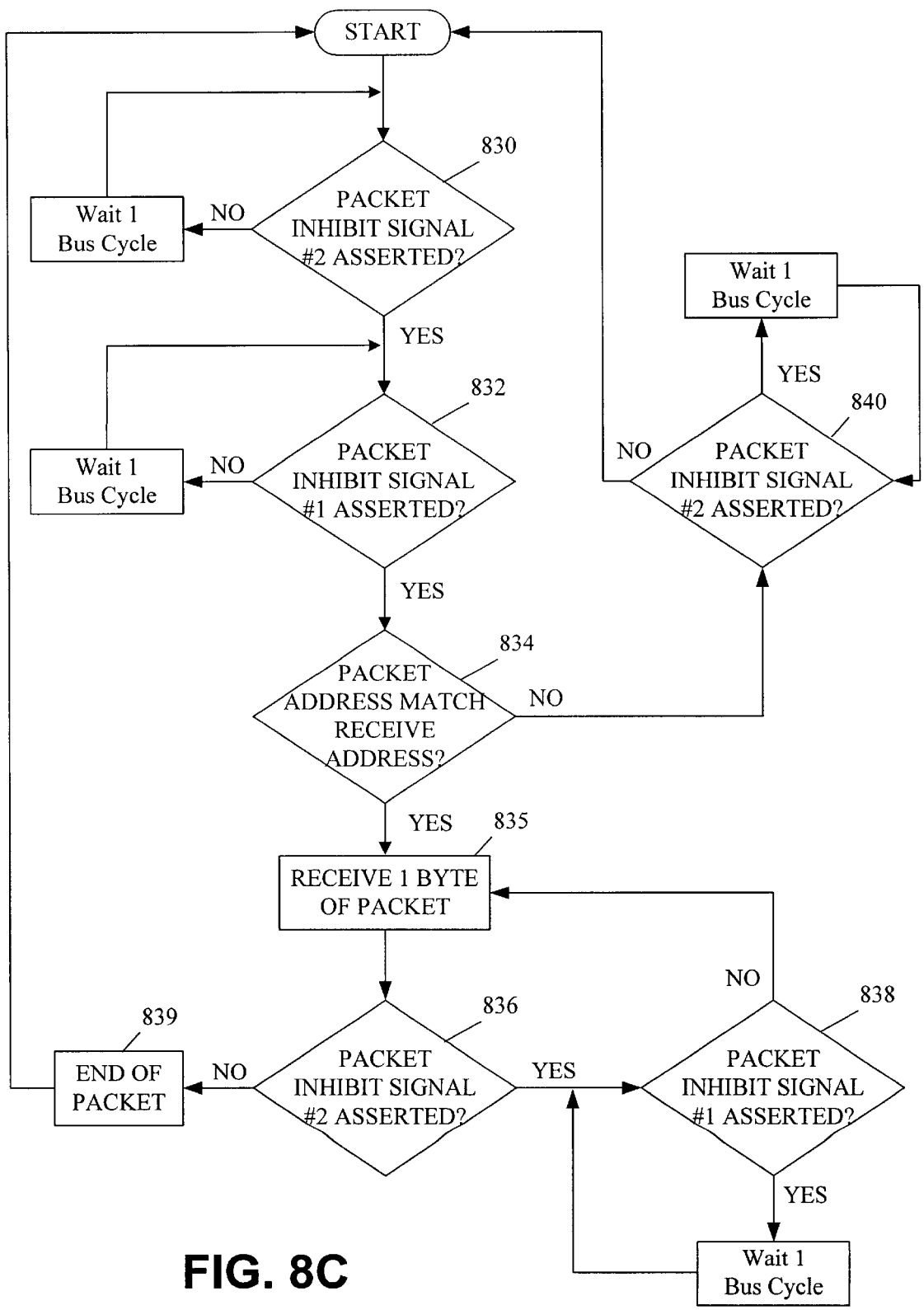

Reference is now made to FIGS. 8A, 8B and 8C, which are flowcharts that, together, illustrate the top-level operation of the inventive system. For the purposes of facilitating the discussion of FIGS. 8A–8C, the shared bus shall be assumed to transmit 1 octet of TDM or packet data per bus cycle, implying a shared bus width of 8 bits. When reduced to practice the shared bus may be of arbitrary width. Also for the purpose of illustrating the packet transmission algorithms, the second packet inhibit indicator 444 is used to indicate a packet transmission is in progress, and that bus arbitration occurs between packet transmissions (as opposed to arbitration overlapping with the previous packet transmission). It will be appreciated that these figures are presented for purposes of illustrating the operation of the system, and that they actually operate in concert. That is, FIG. 8A is directed to the top-level operation relating to the transmission/reception of TDM data, and the assertion of the first packet inhibit signal 442. In contrast, FIG. 8B is directed to the top-level operation relating to the transmission of packet data. FIG. 8C is directed to the top-level operation relating to the reception of packet data.

Referring first to FIG. 8A, the system only transmits TDM data in appropriate TDM designated time slots (e.g., time slots 1–3, in the example of FIG. 6A). Thus, at step 802 it determines whether it is presently in an appropriate time slot for TDM transmission/reception. If not, it de-asserts the first packet inhibit signal 442 (step 804). If, however, it is presently in an appropriate time slot, then the system asserts the first packet inhibit signal (step 808) and transmits or receives the appropriate TDM data (step 810).

Referring now to FIG. 8B, before any packet data is transmitted or received over the shared bus 404, the packet modules check to see whether the first packet inhibit signal 442 is asserted (step 820). If YES, (indicating TDM transmission occurring), then no processing is performed by the packet modules. If NO (indicating no TDM transmission occurring), then the packet modules process the state of the packet channel. The evaluation of the first packet inhibit signal 442 is made with every bus cycle. If the second packet inhibit signal 444 is not asserted (step 822), (indicating the packet channel is idle) and a module determines it has packet data for transmission, it contends for the packet channel. If it wins contention (step 824), it asserts the second packet inhibit signal (step 825), takes control of the packet channel, and begins packet transmission (stesp 827) during all bus cycles in which first packet inhibit signal 442 is not asserted (step 826). During packet transmission, the second packet inhibit signal 444 remains asserted, preventing other modules from requesting the bus. Upon completion of transmitting the last byte of the packet (step 828), the second packet inhibit signal is deactivated (step 829), allowing other packet modules to contend for the packet channel.

FIG. 8C illustrates the operation of the packet receiver. All packet receivers wait until the end of the current transmission for synchronization (step 830), and then the start of the next packet transmission. Upon detection of the start of transmission (second packet inhibit signal transition from inactive to active), it checks the packet address against its own address (step 834). If a match occurs then the packet module receives the packet. If no match occurs, the receiver waits for the start of the next packet transmission (step 840). During each bus cycle the receivers monitor the state of the first packet inhibit signal (step 838). If the first packet inhibit signal is active, then no packet processing is performed. If the first packet inhibit signal is inactive, then the octet is processed. Packet reception also involves receiving 1 byte (step 835) and continuing to monitor the state of the Packet Inhibit #2 Signal until it is deasserted (step 836), signifying the end of the packet (step 839).

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for communicating time division multiplexed data (TDM) and packet data over a shared bus comprising the steps of:

dedicating a portion of a data transmission bandwidth of the shared bus to TDM data transmission;

allocating the remaining data transmission bandwidth of the shared bus to packet data transmission;

communicating TDM data over the shared bus, the communicating TDM data step further comprising:

transmitting TDM data over the shared bus during a designated time slot, where the transmitting occurs without contending for the shared bus; and asserting a primary packet data transmission inhibit signal coincident with TDM data transmissions over the shared bus;

communicating packet data over the shared bus, the communicating packet data step further comprising the steps of:

evaluating the primary packet data transmission signal;

contending for the shared bus, responsive to the evaluating step determining that the primary packet data transmission signal is de-asserted, where multiple packet modules are capable of contending contemporaneously;

granting access to the shared bus to a winning packet module through a contention mechanism;

evaluating a secondary packet data transmission inhibit signal; and transmitting a data packet over the shared bus by the winning packet module, responsive to the evaluating step determining that the secondary packet data transmission inhibit signal is de-asserted.

2. The method as defined in claim 1 further including the step of asserting a secondary packet data transmission signal when packet data is being communicated over the shared bus.

3. The method as defined in claim 1 further including the step of asserting a secondary packet data transmission signal at the initiation of a communication of packet data over the shared bus.

4. The method as defined in claim 1 further including the step of de-asserting a secondary packet data transmission signal at the termination of a communication of packet data over the shared bus.

5. A computer readable storage medium containing program code for controlling a method for communicating time division multiplexed data (TDM) and packet data over a shared bus comprising the steps of:

dedicating a portion of a data transmission bandwidth of the shared bus to TDM data transmission;

allocating the remaining data transmission bandwidth of the shared bus to packet data transmission;

communicating TDM data over the shared bus, the communicating TDM data step further comprising:

transmitting TDM data over the shared bus during a designated time slot, where the transmitting occurs without contending for the shared bus; and asserting a primary packet data transmission inhibit signal coincident with TDM data transmissions over the shared bus;

communicating packet data over the shared bus, the communicating packet data step further comprising the steps of:

evaluating the primary packet data transmission signal;

contending for the shared bus, responsive to the evaluating step determining that the primary packet data transmission signal is de-asserted, where multiple packet modules are capable of contending contemporaneously;

granting access to the shared bus to a winning packet module through a contention mechanism;

evaluating a secondary packet data transmission inhibit signal; and transmitting a data packet over the shared bus by the winning packet module, responsive to the evaluating step determining that the secondary packet data transmission inhibit signal is de-asserted.

* * * * *